Figure 1:
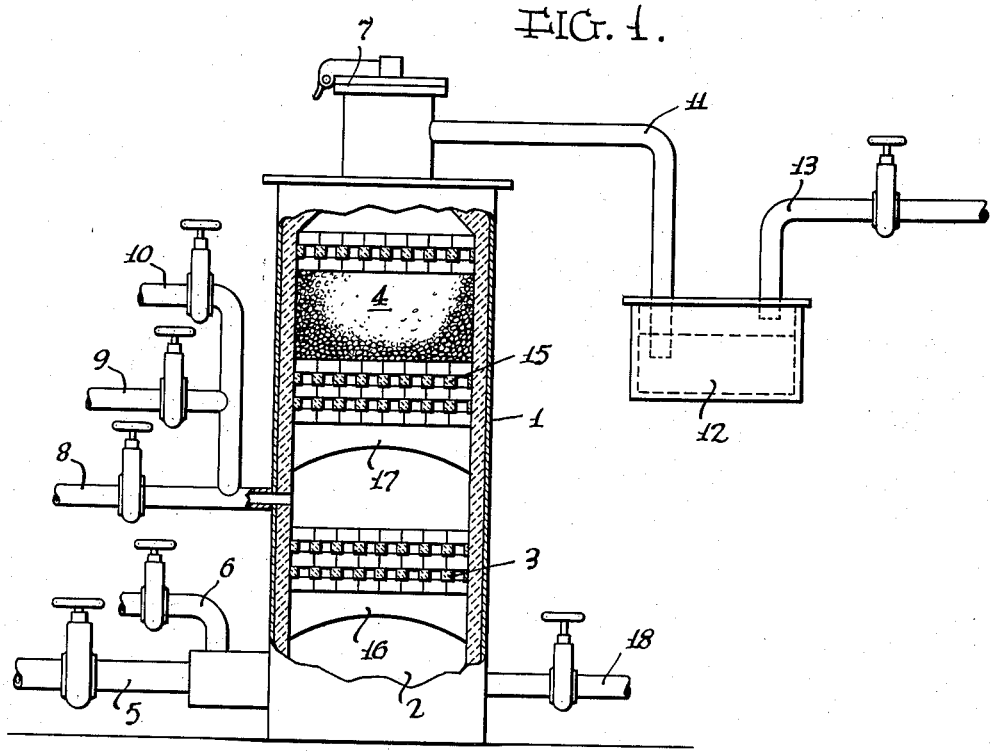

Inventor:
Price W. Janeway Jr., dec'd.
Christine Hawkins, exec.
by Howson & Howson
Attys.

United States Patent Office 2,743,171
Patented Apr. 24, 1956

2,743,171

METHOD FOR MAKING GAS RICH IN HYDROGEN

Price W. Janeway, Jr., deceased, late of Media, Pa., by Christine Hawkins, executrix, Philadelphia, Pa., assignor, by mesne assignments, to The United Gas Improvement Company, Philadelphia, Pa., a corporation of Pennsylvania Application August 23, 1950, Serial No. 180,971

7 Claims. (Cl. 48—196)

The present invention relates to the production from hydrocarbons in the gaseous state, of a gas rich in hydrogen and oxides of carbon, mainly carbon monoxide. More particularly, it relates to a cyclic process comprising a reaction between a hydrocarbon in the gaseous state and steam, known as reforming, for the manufacture of a gas which is rich in free hydrogen and oxides of carbon, mainly carbon monoxide, which is especially suitable, upon which appropriate enrichment with a hydrocarbon gas, for distribution in city gas mains, and which can be made interchangeable with any of the presently available manufactured gases distributed in city gas mains.

Heretofore, the reforming of a gaseous hydrocarbon has been accomplished for the most part by passing it through a coke fire, preferably with process steam admixed. In this way, thermal cracking occurs with the formation of hydrogen and carbon. Little or none of the carbon content of the gaseous hydrocarbon, however, is converted directly to carbon monoxide in the vapor phase, although some of the deposited carbon may be converted to carbon monoxide and hydrogen by reaction of the steam with the hot coke fire bed. Generally, however, the carbon which is deposited in the fuel bed is consumed when blasting the fire. On the other hand, the carbon which passes out with the gas, clogs the gas mains and condensing apparatus and must be scrubbed from the gas by water sprays or precipitated electrically, at considerable added expense. Furthermore, such carbon is obviously lost to the gas-making process.

It is known that gaseous hydrocarbons can be reacted with steam to liberate hydrogen and at the same time form carbon monoxide by union of the carbon of the hydrocarbon gas with the oxygen of the steam, and liberation of additional hydrogen from the steam, but the processes available have possessed certain disadvantages. For example, catalysts have been employed to permit the reaction to take place at a temperature below that at which thermal cracking occurs, in order to avoid production of carbon as an end product. The equipment hitherto used for catalytic conversion of the hydrocarbons with steam is very costly. It has mainly consisted of high alloy metal tubes or retorts filled with catalytic material externally in a furnace. The hydrocarbon gases and steam are passed through the catalytic material continuously with production of hydrogen, carbon monoxide, and small amounts of carbon dioxide. As stated, the process conducted in such equipment has certain disadvantages. Thus the temperature of the catalyst is maintained by conduction of the heat from the furnace, through the tubes, to supply the heat of formation of the product gas and its sensible heat. The conductivity of the catalytic material in discrete particle form is not high so that the metallic tubes or retorts, if the catalyst is held at a high temperature of, for example, from 1600° F.–1800° F., must operate at a temperature not very far below the maximum safe temperature of the most resistant metal alloy tubes and necessarily higher than the reaction temperature of the catalyst. Furthermore, since the conduction from particle to particle of the catalyst is poor, the temperature of the catalyst next to the tube or retort wall is higher than at the center, making a non-uniform temperature across the tube or retort. In addition, not only are the high alloy metal tubes expensive and subject to considerable maintenance costs but the multiplicity of tubes requires a multiplicity of valve connections and flow meters which in turn add to the expense of installation.

Because of these difficulties, inherent in a continuous, externally heated reforming system, various cyclic processes have been suggested from time to time. One such process involved the use of a catalyst bed which was alternately blasted with burning gases to store heat in the catalyst followed by passing the gaseous hydrocarbon and steam through the bed to effect conversion. However, by this method, in order to avoid destruction of the catalyst bed by excessive combustion temperatures, the quantity of heat stored in the catalyst bed was limited, with the result that the incoming cooler steam and hydrocarbon gas, coupled with the high heat requirements of the reforming reaction itself rapidly cooled the catalyst to below reaction temperatures and caused wide and rapid fluctuations in temperature. Also since the heat required for raising the reactants to reaction temperature and for the resulting endothermic reaction, was supplied by the heat stored in the catalyst bed, excessively large amounts of catalyst, a very expensive item, were required. In addition, in many of these prior cyclic processes, relatively large amounts of carbon and other combustible materials were deposited on the catalyst which decreased its activity and clogged the gas passages through the catalyst bed.

A recent substantial improvement in cyclic catalytic processes for producing gas rich in hydrogen and oxides of carbon, mainly carbon monoxide, is disclosed and claimed in copending application of John Hawley Taussig, Jr., Serial No. 124,648, now Patent Number 2,665,979. In accordance with the process there disclosed in one part of the cycle, fluid fuel is burned in a combustion chamber and the hot products of combustion are passed through a zone filled with heat storage material and then through a zone of catalyst to store heat therein and to supply the heat required for the process. In the other part of the cycle, the reacting hydrocarbon, in the gaseous state and mixed with steam, and, in the preferred embodiment with air, is conducted first through the zone containing heat storage material, which serves as a preheating zone, to raise the temperature of the mixture to the reacting temperature, and then through the zone containing the catalyst in which the reaction takes place, producing a clean gas in which the hydrogen of the reacting hydrocarbon has been liberated and the carbon thereof has been combined with the oxygen in the steam (and of the air if air is used) to form carbon monoxide and carbon dioxide. By this procedure, before the reactants are brought in contact with the catalyst they are blended and uniformly preheated in a preheating zone containing the heat storage material which in turn is heated by direct contact with the combustion gases in the heat storage portion of the cycle. This process overcomes many disadvantages of the prior art procedures. Before distribution as city gas, if such use be desired, the gas produced during the reforming portion of the cycle will have mixed therewith a predetermined portion of normally gaseous hydrocarbon in order to provide the desired calorific value.

There are, however, several limitations on the above-described process. As indicated above, the entrance portion of the heat storage zone is adjacent the combustion zone so that the burning fuel and air, through radiation and direct contact, impart extremely high temperatures to the first portion of the preheating zone. Therefore, since the incoming hydrocarbon and steam, and air, if used, employed during the reforming portion of the cycle contact this portion of the heat storage material, there is danger of thermally cracking initial portions of the hydrocarbon with the deleterious formation of carbon. This danger places a limitation on the vigor of combustion tolerated in the combustion zone, and yet due to the cooling effect of these incoming materials on this same portion of the heat storage zone, together with the over-all heat requirements of the process, it would be preferred not to have such a limitation. As a necessary corollary to this limitation is the difficulty due to faulty ignition of fuel during the heating steps when the cooling effect of the incoming reactants has, by the end of the reforming period of the cycle, reduced the temperature of the combustion zone and initial portion of the heat storage zone to below ignition temperatures. There is thus presented the problem of balancing temperatures of reactants and quantities thereof with temperatures provided during the heating steps in order to provide operating temperatures which neither swing so high as to cause thermal cracking and so low as to prevent normal ignition of the fuel or to extinguish the burning fuel if already ignited. Moreover, there is no way to control catalyst bed temperature independent of combustion chamber temperature. Thus to increase catalyst temperature, the combustion chamber temperature must be increased and vice versa.

It is, therefore, an object of the present invention to provide a cyclic process for the catalytic production of a gas rich in hydrogen and oxides of carbon, mainly carbon monoxide, wherein the danger of thermally cracking the hydrocarbon reactant before it contacts the reforming catalyst is eliminated.

A further object is to provide a cyclic catalytic process of the type described wherein no procedural limitation on the vigor of combustion employed during heat storage steps is presented.

Another object is to provide a process of the type described in which the danger of faulty ignition of the fuel during the heating steps due to undue cooling coupled with limitations placed on heating is eliminated.

Another object is to provide a process of the type described combustion chamber temperatures and catalyst bed temperatures may be separately controlled.

Other objects, including the provision of a novel apparatus in which to carry out the novel process will become apparent from the following specification and the claims.

The cyclic process of the present invention involves, in series, and in flow-communication along a confined path, a combustion chamber, a first heat storage bed of refractory material, a second heat storage bed of refractory material, and a bed of reforming catalyst, and comprises the steps of burning a fluid fuel in the combustion chamber and passing the resulting hot products of combustion serially through said first heat storage bed, said second heat storage bed, and said catalyst bed, storing heat therein; admitting a hydrocarbon to said path between said first heat storage bed and said second heat storage bed, and passing said hydrocarbon, in the gaseous state and in admixture with steam, and in the preferred embodiment with air, through said second heat storage bed to heat said mixture to reacting temperature, and thence through said catalyst bed, converting said mixture to a gas rich in hydrogen and oxides of carbon, mainly carbon monoxide, which is led off to storage.

Figure 2:
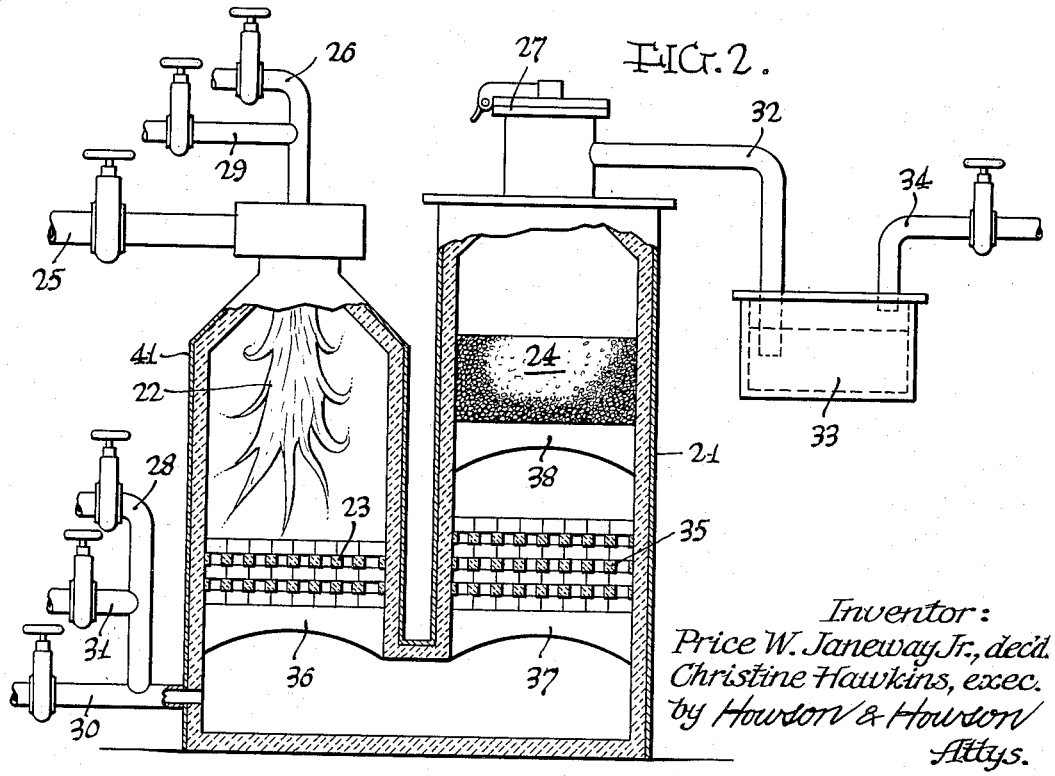

The operation of the process and apparatus will be more clearly understood from a consideration of the drawings, in which:

Figure 1 shows diagrammatically an apparatus in which the process of the present invention may be carried out; and Figure 2 shows diagrammatically another embodiment of the apparatus in which the process of the invention may be carried out.

In Figure 1, 1 represents a refractory-lined chamber which may be the superheater of a conventional water gas set with appropriate modification as is obvious from the drawing. 2 represents the combustion chamber which may be nothing more than a space preceding the first heat storage zone 3. Heat storage bed 3 consists of heat accumulating refractory bodies such as fire brick arranged in familiar checkerwork pattern, as shown or randomly arranged pieces of refractory material, or a combination of both. The heat storage material may be supported as by fire brick arch 16. A second heat storage zone 15, supported as by arch 17, is provided and this is as described in connection with heat storage zone 3. It will be realized that the heat storage beds need not be single units. In other words, heat storage beds 3 or 15, or both, may be made up of two or more components. The catalyst bed is represented by 4, and may be supported on heat storage bed 15 as shown, or on a separate fire brick arch. Numerals 5 and 6 represent respectively the air and fluid fuel supply means for combustion to heat the apparatus, and 7 the stack valve through which the waste heating gases may be discharged to the atmosphere, or to a waste heat boiler (not shown), before being vented to the atmosphere. The entrance for the hydrocarbon reactant for introduction into second preheating zone 15 is represented by 8, the entrance for process steam at 9, and for process air at 10. 11 represents the conduit through which gas leaves the reaction chamber, passing through wash box 12 to storage by valved conduit 13. In accordance with known gas practice, the gases leaving the reaction chamber for storage may pass through a waste heat boiler (not shown) before reaching the wash box. The flow of the respective materials into and from the set through the described conduit means is controlled by suitable valves as shown. As will be discussed more in detail hereinafter, a portion or all of the process steam may be introduced into combustion zone 2, as at conduit 18. As indicated previously, in accordance with the preferred embodiment of the invention, air is also employed with the gaseous hydrocarbon and steam, and this may be admitted in whole or in part, during the gas-making run, through connection 5, or through connection 10. Usually it will be found advantageous to introduce part of the process steam or air, or both to the combustion chamber to prevent excessive accumulation of heat at that point.

The operation is, as stated, cyclic and the process comprises first a heating or blasting period during which air and a fluid are admitted through connections 5 and 6, respectively, combustion taking place in the combustion chamber 2. The hot combustion gases are passed through first preheating or heat storage zone 3, storing heat therein and raising it to a temperature above the temperature required for the reformation reaction, are then passed through second preheating or heat storage zone 15, storing heat therein, are then passed through the catalyst bed 4 at a somewhat reduced temperature, and may then be discharged through stack valve 7. Since combustion takes place adjacent the entrance portion of heat storage bed 3, the highest temperatures are concentrated there. After the set is heated to operating temperature, the stack valve 7 is closed and air and fuel connections 5 and 6 are also closed. At the same time, connections 8 and 9 and/or 18 are opened to admit respectively the hydrocarbon reactant and the process steam to react with the hydrocarbon. If desired, and in accordance with the preferred embodiment, process air may be admitted as by opening connections 5 and/or 10. The use of the air has the advantage of helping to maintain operating temperatures, maintaining the degree of temperature swing at a minimum and of augmenting the gaseous output of the apparatus. The hydrocarbon is preheated substantially to reaction temperature, which, as will be discussed more fully hereinafter, will be at a temperature below that at which the thermal cracking takes place, by passing through second preheating or heat storage zone 15, absorbing heat therefrom. The process steam, and process air if used, entering the combustion chamber become preheated partly by their flow through first heat storage bed 3 and partly by their flow through second heat storage bed 15. As stated, a portion or all of the steam and/or air may be introduced to the system between heat storage beds 3 and 15, in which case heat storage bed 15 may be relied upon to supply the necessary heat to those materials not passed through heat storage bed 3. In any event, all the reactants are mixed before they pass through heat storage bed 15 wherein they attain the desired temperature for reaction in catalyst bed 4.

After leaving preheating or heat storage zone 15, the reaction gases enter the catalyst bed 4 where the following typical reactions take place (when natural gas is being reformed):

(1) With steam, $CH_4 + H_2O = 3H_2 + CO$
(2) With air, $CH_4 + \frac{1}{2}O_2 + 1.9N_2 = 2H_2 + CO + 1.9N_2$ It will be noted from the above that since the hydrocarbon is not passed through first heat storage zone 3, where the highest temperatures are concentrated, there is no danger that it will be prematurely cracked thermally before reaching the catalyst bed. For the same reason, the temperature of the entrance portion of first heat storage bed 3 is not unduly lowered causing ignition difficulties. Thus, as a practical result, there is no limitation, so far as danger of thermally cracking the hydrocarbon reactant is concerned, as to the vigor of combustion in the combustion zone, and the combustion zone and the entrance portion of the first heat storage zone may be kept as hot as desired to insure ignition of the fuel and maintenance of combustion thereof during the heating steps of the cycle without loss of temperature control in the catalyst bed. The temperatures of the combustion zone and of the entrance portion of the first heat storage bed may be sufficiently regulated by controlling the amounts of process steam, and of process air if used, admitted thereto. Thus all or a part of the process steam may be passed through first heat storage bed 3 before passing through heat storage bed 15, or all or part may be admitted to the set between the first and second heat storage beds and passed only through the second heat storage bed. Likewise, all or a part of the process air, if used, may be admitted either before the first heat storage bed, or between the first and second heat storage beds.

While the drawing Figure 1 illustrates one shell, it will be understood that a two or three shell set may be employed following the same general principles described above. For instance, the carburetter and superheater shells of a conventional carburetted water gas set may be employed. These shells are connected at their bases by an open conduit. In practicing the present process in this arrangement, the fuel and air can be admitted to the top of the carburetter where combustion takes place, the hot products of combustion passing down through the carburetter, through the first heat storage bed, through the connecting conduit to the superheater and up through the second heat storage bed and catalyst bed as described. In such an arrangement, the gaseous hydrocarbon reactant, and some or all of the process steam, and process air if used, can be admitted between the heat storage beds as described. Similarly, in a three shell arrangement, employing also the generator of a conventional carburetted water gas set, the generator may serve as combustion chamber, and the fuel and air, and also some or all of the process steam, and process air if used, can be admitted to the generator, flowing to the carburetter top by way of the open conduit connecting the tops of the generator and carburetter, thence to the superheater as described.

Likewise, it will be understood that where a two- or three-shell set be employed, a heat storage bed may be incorporated in, for example, the carburetter functioning as the first heat storage bed in the above description. In this case, the second heat storage zone may be provided in the superheater before the catalyst bed, and the gaseous hydrocarbon, and some or all of the process steam, and process air if used, may be admitted to the system at a point between the first and second heat storage beds, such as at the base of the superheater. Thus, as shown in Figure 2, 21 and 41 represent two refractory lined chambers such as the superheater and carburetter, respectively, of a conventional water gas set. 22 represents the combustion chamber which is a space above first heat storage bed 23. Heat storage bed 23 may be supported as by arch 36, and may be as described in connection with heat storage bed 3 of Figure 1. A second heat storage bed 35, supported as by arch 37, is provided in chamber 21. Catalyst bed 24 is supported as by a fire brick arch 38, as shown, or on heat storage bed 35. Numerals 25 and 26 represent respectively the air and fluid fuel supply means for combustion to heat the apparatus, and 27 the stack valve through which the waste heating gases may be discharged to the atmosphere, or to a waste heat boiler (not shown) before being vented to the atmosphere. The entrance for the gaseous hydrocarbon reactant for introduction into second heat storage zone 35 is represented by numeral 28. In this figure, process steam may be introduced either entirely at 29, or entirely at 30, or partly at 29 and partly at 30. Similarly, process air, if used, may be introduced entirely at 25 or entirely at 31, or partly at 25 and partly at 31. 32 represents the conduit through which gas leaves the reaction chamber, passing through wash box 33, to storage by way of valved conduit 34. As in the case of the apparatus shown in Figure 1, gases leaving the reaction chamber for storage may pass through a waste heat boiler (not shown) before reaching the wash box. The flow of the respective materials into and from the set through the described conduit means is controlled by suitable valves as shown.

The operation of the process in Figure 2 is similar to that in Figure 1. During the heat storage portion of the cycle, fuel and air are introduced through lines 26 and 25 respectively, ignited and burned in combustion chamber 22. The resulting hot products of combustion are passed serially through first heat storage zone 23, second heat storage zone 35, and catalyst zone 24, and thence through stack valve 27. When the set has been heated to the desired extent, the combustion of fuel and air is terminated, and gaseous hydrocarbon reactant introduced to the system at a point between the first and second heat storage zone such as through conduit 28. At the same time, process steam is admitted through conduits 29 and/or 30. Preferably, process air is also admitted at the same time through conduits 25 and/or 31. In any event, the gaseous hydrocarbon and steam, and air if used, are thoroughly mixed and uniformly heated to reaction temperature by the time they have passed through second heat storage zone 35. Upon the passage of the hot reactants through catalyst bed 24, a gas rich in hydrogen and oxides of carbon, mainly carbon monoxide, is produced which is withdrawn, as it issued from the catalyst bed, to storage by way of conduit 32, wash box 33, and conduit 34.

It will be realized that in accordance with common gas-making practice steam purges may be, and preferably are, made between the heating and the gas-generating portion of the cycle, or between the gas-generating and heating portions of the cycle, or both. These purges, as known to those familiar with the gas-making art, serve to clear the system of undesirable gases which may contaminate the generated gas or serve to force residual desirable gases to storage.

Catalysts for the endothermic reaction of gaseous hydrocarbons with steam to produce gas mixtures comprising free hydrogen and carbon monoxide, together with variable proportions of carbon dioxide, are well-known. The catalysts most frequently proposed for this purpose are metals of the iron group, with nickel and cobalt catalysts usually preferred, although other high melting metals such as vanadium, chromium, platinum, and the like have been used. As between nickel and cobalt, the nickel catalysts have usualy been used because the reaction is easier to control and the nickel catalysts are less expensive.

A suitable refractory carrier is frequently employed, on the surface of which the catalytic material is disposed or throughout which it is distributed. Difficultly reducible oxides such as alumina, silica, magnesia, calcium oxide, titanium oxide, chromium oxide, oxides of rare earth metals such as, for example, thoria, ceria, and/or others may be present. Compounds such as chromates may be employed.

One method of catalyst preparation involves the precipitation of the catalyst in the form of a salt upon finely divided carrier material, calcination to produce the oxide of the catalyst metal, pelleting or the making of extruded shapes from a paste of the calcined material, and reduction of the oxide at elevated temperature to the metallic catalyst, either as a step in the preparation of the catalyst or after it has been placed in the gas-treating equipment. In the preparation of another type of catalyst, preformed refractory bodies, such as alundum balls, and the like, are impregnated with a salt of the catalytic metal and thereafter the impregnated shapes are calcined to form the oxide of the metal which is subsequently reduced. The catalyst employed may be produced by any desired procedure which forms no part of this invention.

The hydrocarbon material reformed in the gas-generating portion of the cycle may comprise normally gaseous hydrocarbon material such, for example, as methane, ethane and propane or butane and heavier hydrocarbon distillates. Corresponding unsaturated hydrocarbons may be present in any desired concentration, such, for example, as ethylene, propylene, butylene, etc. When normally liquid hydrocarbons are employed, appropriate vaporizing means will be relied upon to convert the hydrocarbon to the gaseous state. The present process is, however, particularly advantageous for the reforming of normally gaseous hydrocarbons. Natural gas, which is primarily methane and refinery oil gas, which is primarily methane and ethylene are among the hydrocarbon materials which may be employed. Natural gas, because of availability is particularly preferred as the hydrocarbon reactant.

With respect to the fuel employed during the heat-storage period of the cycle, it may be any fluid—that is, gaseous or liquid combustible. Hydrocrabon, such as those mentioned above, and especially natural gas, are particularly satisfactory, although gaseous fuel not rich in hydrocarbon, such as water gas, producer gas, and the like, may also be used. Liquid hydrocarbons, such as fuel oil, gas oil, gasoline, kerosene, tar, and the like, may be employed if desired. In the event a liquid fuel is employed, conventional spraying or other vaporizing means may be utilized to facilitate combustion.

The proportions of steam to hydrocarbon reactant employed during the reforming portion of the cycle generally run between about .8 mol and about 5 mols, and preferably between about 1.5 and about 2.5 mols, of steam for each mol of carbon in the hydrocarbon reactant. When air is employed during the reforming portion of the cycle, the proportion of steam to hydrocarbon required may be decreased in which case as low as about .8 mol of steam per mol of carbon in the hydrocarbon reactant may be employed.

As stated, in accordance with the preferred embodiment of the process, some air is employed during the reforming portion of the cycle. The amount of air so employed will be generally less than about 2 mols thereof per mol of carbon in the hydrocarbon reactant and in most cases will be less than about 1 mol thereof per mol of carbon in the reactant. Preferably, the amount of air employed during the reforming portion of the cycle is between about .1 and about .6 mol thereof per mol of carbon in the hydrocarbon reactant.

Referring to the temperature conditions employed during the cycle, the reactants, as stated, should be heated substantially to reacting temperatures by the time they have passed through the second heat storage zone and before they pass through the catalyst ozne. The main consideration, therefore, are that the hydrocarbon reactant, while being heated sufficiently to effect substantially complete reaction thereof in the catalyst zone, is not heated, during its passage through the second heat storage bed, to a point where significant thermal cracking thereof takes place with formation of any signficant quantity of carbon. The exact temperature conditions governing these considerations will depend in part upon the particular hydrocarbon reactant employed. It has been found, for example, that, when reforming natural gas, the average temperature of the heat storage material in second preheating zone should not exceed about 2000° F., nor should it fall below about 1400° F. In other words, the heat storage material in the second heat storage bed will have an average temperature at the beginning of the reforming portion of the cycle of not over about 2000° F., and, at the end of the reforming portion of the cycle, of not less than about 1400° F. To insure a reforming run of reasonable length, when reforming natural gas, the average temperature of the heat storage material, in the second heat storage bed, at the beginning of the reforming portion of the cycle, will not be less than about 1500° F. Because of the direction of flow of the hot combustion gases during the heat storage portion of the cycle, first through the two heat storage beds, then through the catalyst zone, the temperature of the catalyst, will normally be somewhat less than the temperature of the heat storage zones, and generally the temperatures in the catalyst bed, at the beginning of the reforming run, when reforming natural gas and referring to the above temperature ranges, will not exceed about 1800° F. and at the end of the run, may be as low as about 1300° F. Since the hydrocarbon reactant is not passed through the first heat storage bed, the temperatures to which that bed becomes heated during the heat storage step are not critical, it being only necessary to provide enough cooling effect during the heating period so that excessive temperatures will not be generated at the point of admission of the hydrocarbon reactant while temperatures in the combustion chamber and at the entrance portion of the first heat storage bed remain sufficiently high to insure satisfactory ignition of the fuel at the beginning of the heat storage steps.

When reforming hydrocarbons heavier than methane, it may be desirable to employ somewhat lower temperatures in the second heat storage bed, in order to avoid thermal cracking and also since the reformation of hydrocarbons heavier than methane, may not require temperatures as high as when methane is reformed. Thus, when reforming hydrocarbons heavier than methane, temperatures as low as about 1000° F. may be employed in the preheating zone.

The heat storage portion of the cycle may be conducted by burning the fuel with excess air, with insufficient air to support complete combustion, or with just the amount theoretically required for complete combustion, so long as the heat storage beds and catalyst are raised to the required temperatures. In a preferred embodiment of the process, however, at least the latter part of the heating portion of the cycle is conducted by burning the fuel with insufficient air to support complete combustion, as described in copending application of John Hawley Taussig, Jr., Serial Number 124,648, now Patent Number 2,665,979, thereby producing combustion products substantially devoid of free oxygen and having a substantial content of hydrogen and carbon monoxide in addition to their content of carbon dioxide, water vapor, and nitrogen. This insures the maintenance of the catalyst in a highly active state. In this type of operation, it is also advantageous to conduct the first part of the heat storage portion of the cycle by burning fuel in the presence of air in excess of that required for complete combustion. The excess air also insures that any carbon traces accidentally deposited during the reforming portion of the cycle will be removed.

Referring to the gas produced during the reforming portion of the cycle, it will chiefly comprise hydrogen and carbon monoxide with small but varying amounts of gaseous hydrocarbons and carbon dioxide and with varying amounts of nitrogen depending upon the amount of air employed during the reforming portion of the cycle. While this gas is combustible, and is useful for many purposes, it does not posses the characteristics which would make it usable per se as city gas. For instance, its calorific value will be lower than that required for utilization in city gas distribution systems. Thus, if the gas produced during the reforming portion of the cycle is to be distributed as city gas, it must be enriched with gas having a calorific value higher than that desired in the mixed gas. Such enriching gas may be any of the gaseous hydrocarbons mentioned above and particularly natural gas.

In many cases, however, the mere enrichment of the gas produced during the reforming portion of the present process with a gas of higher calorific value does not provide a mixed gas possessing all the characteristics required in a particular area. For instance, while a mixed gas possessing the desired calorific value may be obtained by mixing, for example, natural gas with the gas produced during the reforming portion of the present process, the specific gravity of the mixed gas may still be below, and/or the ratio of hydrogen to inerts above, the specifications in a particular area. Or, because of its availability in a particular area, it may be desirable to utilize coke oven gas as part of the distributed gas. Since coke oven gas is relatively rich in hydrogen, its admixture with the gas produced during the reforming portion of the present process, which is also rich in hydrogen, would result in a ratio of hydrogen to inerts well above that required.

For these reasons, it is often desirable to also mix with the gas produced during the reforming portion of the process a controlled quantity of a gas possessing a high specific gravity and a low ratio of hydrogen to inerts. Such a gas may be produced by the combustion of a hydrocarbon, preferably in the presence of insufficient air to support complete combustion. An especially advantageous gas in this regard is the product of incomplete combustion produced during the above-described heat storage stage in which a fluid hydrocarbon fuel is burned in the presence of insufficient air to support complete combustion.

The exact proportions of enriching gas, and products of combustion if used, and coke oven gas if used, mixed with the gas produced during the reforming portion of the cycle to provide a finished gas suitable for distribution as city gas are subject to variation, depending not only upon the specifications to be met, but also upon the exact characteristics of the enriching gas, and of the gas produced during the reforming portion of the cycle, and also of the products of combustion and coke oven gas if used. Generally manufactured city gases have a calorific value of between about 520 and about 570 B. t. u., a specific gravity of between about .45 and about .75 and a ratio of hydrogen to inerts of from about 1 to 1 up to about 6 to 1. On the other hand, the gas produced during the reforming portion of the cycle will have a calorific value lower than that recited above, for example, around 300 B. t. u., a specific gravity within or somewhat below (for example .35) the range recited above, and a ratio of hydrogen to inerts within or somewhat above (for example, 10 to 1) the range set forth above. The enriching gas will have a calorific value well above that required, natural gas having a heating value around 1050 B. t. u., a specific gravity around .61–.63, and a hydrogen to inerts ratio of zero, since it is usually free of hydrogen. The product of incomplete combustion will have a calorific value well below the above-recited range and may even be less than 100 B. t. u.; its specific gravity will be above the recited range often being around 1, and its hydrogen to inerts ratio will be well below the recited range.

It will be seen that although the proportions of the various gases that are to be mixed may vary widely, the determination of the exact proportion needed in any particular case will offer no difficulty to those familiar with the gas-making art, and can be arrived at by simple calculation. By varying the proportions of reactants, namely gaseous hydrocarbon and steam, or gaseous hydrocarbon, steam, and air, used during the reforming portion of the cycle, the various characteristics of the resulting gas can be controlled as desired. In addition to these variables, by varying the amount of products of combustion, such as the products of incomplete combustion formed during the heat storage portion of the cycle, which may be mixed with the gas produced during the reforming period, further control of the characteristics of resulting mixed gas is afforded. In any event, it will be seen that the present process offers wide flexibility to produce gas interchangeable with any manufactured city gas, or suitable for admixture with other gases, to meet changing situations encountered in the city gas industry.

Considerable modification is possible in the selection of the hydrocarbon reactant and fuel, as well as in the proportions of reactants without departing from the scope of the invention.

What is claimed is:

1. The cyclic process for the manufacture of a gas rich in hydrogen and oxides of carbon, mainly carbon monoxide, which comprises in one part of the cycle, burning a fluid fuel, and passing the hot products of combustion serially through a first zone comprising heat storage refractory material, a second zone comprising heat storage refractory material, and a zone of catalyst for the endothermic reaction between hydrocarbons and steam, to store heat thereon; and, in another part of the cycle, passing a hydrocarbon in the gaseous state admixed with steam through said second heat storage zone without thermally cracking said hydrocarbon and without passage of said hydrocarbon through said first heat storage zone, at least a portion of said steam having passed through said first heat storage zone prior to its admixture with said hydrocarbon and passage through said second heat storage zone; passing the hot gases through said catalyst zone to effect conversion thereof into a gas rich in hydrogen and oxides of carbon, mainly carbon monoxide, and collecting said gas.

2. The process of claim 1 wherein air also passes through said second heat storage zone and through said catalyst zone in admixture with said hydrocarbon and steam.

3. The cyclic process for the manufacture of a gas rich in hydrogen and oxides of carbon, mainly carbon monoxide, which comprises, in one part of the cycle, burning a fluid fuel and passing the hot products of combustion serially through a first zone comprising heat storage refractory material, a second zone comprising heat storage refractory material, and a zone of catalyst for the endothermic reaction between hydrocarbons and steam, to store heat therein; and, in another part of the cycle, passing a hydrocarbon in the gaseous state admixed with steam through said second heat storage zone without thermally cracking said hydrocarbon and without passage of said hydrocarbon through said first heat storage zone, at least a portion of said steam being admitted to the system at a point between said first heat storage zone and said second heat storage zone without passage through said first heat storage zone; passing said gases through said catalyst zone to effect conversion thereof into a gas rich in hydrogen and oxides of carbon, mainly carbon monoxide, and collecting said gas.

4. The process of claim 3 wherein air also passes through said second heat storage zone and through said catalyst zone in admixture with said hydrocarbon and steam.

5. The cyclic process for the manufacture of a gas rich in hydrogen and oxides of carbon, mainly carbon monoxide, which comprises, in one part of the cycle, burning a fluid fuel and passing the hot products of combustion serially through a first zone comprising heat storage refractory material, a second zone comprising heat storage refractory material, and a zone of catalyst for the endothermic reaction between hydrocarbons and steam, to store heat therein; and, in another part of the cycle, passing a hydrocarbon in the gaseous state admixed with steam through said second heat storage zone without thermally cracking said hydrocarbon and without passage of said hydrocarbon through said first heat storage zone, and air, at least a portion of said steam and said air having passed through said first heat storage zone prior to their admixture with said hydrocarbon and passage through said second heat storage zone; passing the resulting mixture of hot gases through said catalyst zone to effect conversion thereof into a gas rich in hydrogen and oxides of carbon, mainly carbon monoxide, and collecting said gas.

6. The cyclic process for the manufacture of a gas rich in hydrogen and oxides of carbon, mainly carbon monoxide, which comprises, in one part of the cycle, burning a fluid fuel and passing the hot products of combustion serially through a first zone comprising heat storage refractory material, a second zone comprising heat storage refractory material, and a zone of catalyst for the endothermic reaction between hydrocarbons and steam, to store heat therein; and, in another part of the cycle, passing a hydrocarbon in the gaseous state admixed with steam and air through said second heat storage zone without thermally cracking said hydrocarbon and without passage of said hydrocarbon through said first heat storage zone, at least a portion of said steam having passed through said first heat storage zone prior to its admixture with said hydrocarbon and passage through said second heat storage zone, and at least a portion of said air being admitted to the system at a point between said first heat storage zone and said second heat storage zone without passage through said first heat storage zone; passing the resulting mixture of hot gases through said catalyst zone to effect conversion thereof into a gas rich in hydrogen and oxides of carbon, mainly carbon monoxide, and collecting said gas.

7. The cyclic process for the manufacture of a gas rich in hydrogen and oxides of carbon, mainly carbon monoxide, which comprises, in one part of the cycle, burning a fluid fuel and passing the hot products of combustion serially through a first zone comprising heat storage refractory material, a second zone comprising heat storage refractory material and a zone of catalyst for the endothermic reaction between hydrocarbons and steam, to store heat therein; and, in another part of the cycle, passing a hydrocarbon in the gaseous state admixed with steam and air through said second heat storage zone without thermally cracking said hydrocarbon and without passage of said hydrocarbon through said first heat storage zone, at least a portion of said steam being introduced into the system at a point between said first heat storage zone and said second heat storage zone without passage through said first heat storage zone, and at least a portion of said air having passed through said first heat storage zone prior to its admixture with said hydrocarbon and passage through said second heat storage zone; passing the resulting hot gases through said catalyst zone to effect conversion thereof into a gas rich in hydrogen and oxides of carbon, mainly carbon monoxide, and collecting said gas.

References Cited in the file of this patent

UNITED STATES PATENTS

| Number | Name | Date |
|---|---|---|
| 1,644,146 | Pike | Oct. 4, 1927 |
| 1,992,909 | Davis | Feb. 26, 1935 |
| 2,131,696 | Brandegee et al. | Sept. 27, 1938 |
| 2,173,984 | Shapleigh | Sept. 26, 1939 |
| 2,346,754 | Hemminger | Apr. 18, 1944 |
| 2,430,432 | Marisic | Nov. 4, 1947 |
| 2,524,840 | Shapleigh | Oct. 10, 1950 |
| 2,595,591 | Odell | Apr. 15, 1952 |